US012795416B2

(12) United States Patent
Cao

(10) Patent No.: US 12,795,416 B2
(45) Date of Patent: Nov. 10, 2026

(54) ABNORMAL CELL IDENTIFICATION METHOD AND APPARATUS, AND ELECTRONIC DEVICE

(71) Applicant: VIVO MOBILE COMMUNICATION CO., LTD., Dongguan (CN)

(72) Inventor: Hangting Cao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 370 days.

(21) Appl. No.: 18/393,658

(22) Filed: Dec. 21, 2023

(65) Prior Publication Data

US 2024/0129770 A1 Apr. 18, 2024

Related U.S. Application Data

(63) Continuation of application No. PCT/CN2022/100290, filed on Jun. 22, 2022.

(30) Foreign Application Priority Data

Jun. 25, 2021 (CN) ......................... 202110713676.5

(51) Int. Cl.
*H04W 24/08* (2009.01)
*H04L 43/0811* (2022.01)
(Continued)

(52) U.S. Cl.
CPC ......... *H04W 24/08* (2013.01); *H04L 43/0811* (2013.01); *H04W 48/02* (2013.01); *H04W 76/15* (2018.02)

(58) Field of Classification Search
CPC ..... H04W 48/02; H04W 76/15; H04W 24/08; H04L 43/0811
See application file for complete search history.

(56) References Cited

U.S. PATENT DOCUMENTS

2014/0043998 A1* 2/2014 Wang .................... H04W 24/10 370/252
2014/0315539 A1* 10/2014 Kobayashi ............ H04W 24/02 455/424
(Continued)

FOREIGN PATENT DOCUMENTS

CN 104602277 A 5/2015
CN 108134703 A 6/2018
(Continued)

OTHER PUBLICATIONS

Extended European Search Report issued in related European Application No. 22827591.3, mailed Sep. 25, 2024, 13 pages.
(Continued)

*Primary Examiner* — James P Duffy
(74) *Attorney, Agent, or Firm* — IPX PLLC

(57) ABSTRACT

This application discloses an abnormal cell identification method and an electronic device. The abnormal cell identification method includes: obtaining a failure rate relative growth rate, a user disconnection ratio relative growth rate, and a low network speed ratio of a target cell, where the failure rate relative growth rate, the user disconnection ratio relative growth rate, and the low network speed ratio are all associated with at least one of time information or scene information; determining that the target cell has a first abnormal attribute when a sum of the failure rate relative growth rate and the user disconnection ratio relative growth rate of the target cell is greater than a first threshold; and determining that the target cell has a second abnormal attribute when the low network speed ratio of the target cell is greater than a second threshold.

18 Claims, 2 Drawing Sheets

(51) Int. Cl.

| | |
|---|---|
| ***H04W 48/02*** | (2009.01) |
| ***H04W 76/15*** | (2018.01) |

(56) References Cited

U.S. PATENT DOCUMENTS

| | | | |
|---|---|---|---|
| 2015/0049737 | A1 | 2/2015 | Yang et al. |
| 2015/0282239 | A1 | 10/2015 | Han et al. |
| 2017/0055164 | A1 | 2/2017 | Santhanam et al. |
| 2018/0176825 | A1 | 6/2018 | Ercan et al. |

FOREIGN PATENT DOCUMENTS

| | | | |
|---|---|---|---|
| CN | 110769478 | A | 2/2020 |
| CN | 110830464 | A | 2/2020 |
| CN | 110913455 | A | 3/2020 |
| CN | 113453261 | A | 9/2021 |
| JP | H09252482 | A | 9/1997 |
| JP | 2020039099 | A | 3/2020 |
| WO | 02082777 | A1 | 10/2002 |
| WO | 2013136811 | A1 | 9/2013 |

OTHER PUBLICATIONS

Notice of Reasons for Refusal issued in related Japanese Application No. 2023-579303, mailed Nov. 18, 2024, 7 pages.

International Search Report issued in corresponding International Application No. PCT/CN2022/100290, mailed Sep. 13, 2022, 4 pages.

* cited by examiner

ABNORMAL CELL IDENTIFICATION METHOD AND APPARATUS, AND ELECTRONIC DEVICE

CROSS-REFERENCE TO RELATED APPLICATIONS

This application is a continuation of International Application No. PCT/CN2022/100290, filed Jun. 22, 2022, which claims priority to Chinese Patent Application No. 202110713676.5, filed Jun. 25, 2021. The entire contents of each of the above-referenced applications are expressly incorporated herein by reference.

TECHNICAL FIELD

This application relates to the field of communication technologies, and specifically relates to an abnormal cell identification method and apparatus, and an electronic device.

BACKGROUND

Currently, electronic devices are frequently used in life and work, for example, the electronic devices are used to make calls and access the Internet. Generally, network support is required in a process in which a user uses an electronic device. Different base station equipment manufacturers have different understandings about communication protocols, base station configurations, device configurations of different cells, quantities of access device of different cells, and the like. Therefore, some cells whose network is abnormal may appear. When the electronic device accesses these cells, the user cannot normally use the electronic device.

To ensure that the user normally uses the electronic device, a cell may be identified before the electronic device accesses the cell, so that a cell whose network is normal can be accessed preferentially and a cell whose network is abnormal can be evaded. In the prior art, some cells are regarded as abnormal cells based on an anomaly reported by the user in a process of using the electronic device that cannot be connected to a network.

It can be learned that, based on the method for identifying an abnormal cell in the prior art, fewer abnormal cells are covered.

SUMMARY

Embodiments of this application aim to provide an abnormal cell identification method.

According to a first aspect, an embodiment of this application provides an abnormal cell identification method. The method includes: obtaining a failure rate relative growth rate, a user disconnection ratio relative growth rate, and a low network speed ratio of a target cell, where the failure rate relative growth rate, the user disconnection ratio relative growth rate, and the low network speed ratio are all associated with at least one of time information or scene information; determining that the target cell has a first abnormal attribute in a case that a sum of the failure rate relative growth rate and the user disconnection ratio relative growth rate of the target cell is greater than a first threshold; and determining that the target cell has a second abnormal attribute in a case that the low network speed ratio of the target cell is greater than a second threshold.

According to a second aspect, an embodiment of this application provides an abnormal cell identification apparatus. The apparatus includes: an obtaining module, configured to obtain a failure rate relative growth rate, a user disconnection ratio relative growth rate, and a low network speed ratio of a target cell, where the failure rate relative growth rate, the user disconnection ratio relative growth rate, and the low network speed ratio are all associated with at least one of time information or scene information; a first determining module, configured to determine that the target cell has a first abnormal attribute in a case that a sum of the failure rate relative growth rate and the user disconnection ratio relative growth rate of the target cell is greater than a first threshold; and a second determining module, configured to determine that the target cell has a second abnormal attribute in a case that the low network speed ratio of the target cell is greater than a second threshold.

According to a third aspect, an embodiment of this application provides an electronic device. The electronic device includes a processor, a memory, and a program or an instruction that is stored in the memory and that can be run on the processor, where when the program or the instruction is executed by the processor, the steps of the method in the first aspect are implemented.

According to a fourth aspect, an embodiment of this application provides a readable storage medium. The readable storage medium stores a program or an instruction, and when the program or the instruction is executed by a processor, the steps of the method in the first aspect are implemented.

According to a fifth aspect, an embodiment of this application provides a chip. The chip includes a processor and a communication interface, the communication interface is coupled to the processor, and the processor is configured to run a program or an instruction to implement the method in the first aspect.

According to a sixth aspect, an embodiment of this application provides a computer program product. The program product is stored in a non-volatile storage medium, and the program product is executed by at least one processor to implement the method in the first aspect.

According to a seventh aspect, an embodiment of this application provides a communication device, where the communication device is configured to perform the method in the first aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms “first”, “second”, and the like are intended to distinguish between similar objects but do not describe a specific order or sequence. It should be understood that, terms used in such a way are interchangeable in proper circumstances, so that the embodiments of this application can be implemented in an order other than the order illustrated or described herein. Objects classified by “first”, “second”, and the like are usually of a same type, and the number of objects is not limited. For example, there may be one or more first objects. In addition, in the specification and the claims, “and/or” represents at least one of connected objects, and a character “/” generally represents an “or” relationship between associated objects.

With reference to the accompanying drawings, an abnormal cell identification method provided in the embodiments of this application is described in detail by using specific embodiments and application scenarios.

Figure 1:
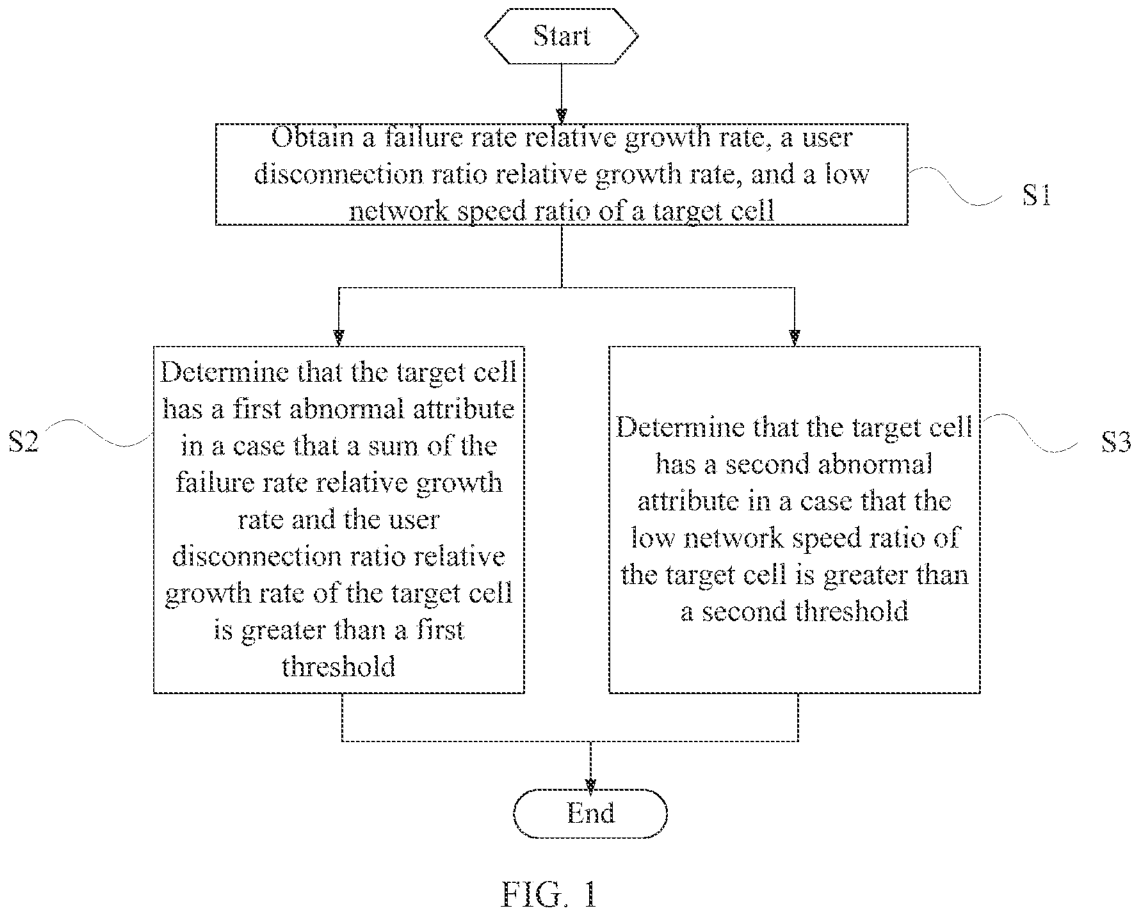
FIG. 1 is a flowchart of an abnormal cell identification method according to an embodiment of this application.

Referring to FIG. 1, FIG. 1 is a flowchart of an abnormal cell identification method according to an embodiment of this application. The method is applied to an electronic device and includes:

Step S1: Obtain a failure rate relative growth rate, a user disconnection ratio relative growth rate, and a low network speed ratio of a target cell.

In this step, the failure rate relative growth rate and the user disconnection ratio relative growth rate are combined to represent ratio information of a first-type network anomaly in the target cell.

In this application, the first-type network anomaly may be a network disconnection anomaly.

The low network speed ratio is used to represent ratio information of a second-type network anomaly in the target cell.

In this application, the second-type network anomaly may be a low-speed network anomaly.

The failure rate relative growth rate, the user disconnection ratio relative growth rate, and the low network speed ratio are all associated with at least one of time information or scene information.

In an implementation, the failure rate relative growth rate, the user disconnection ratio relative growth rate, and the low network speed ratio of the target cell may be obtained based on preset time information.

For example, the preset time information is one week, and a failure rate relative growth rate, a user disconnection ratio relative growth rate, and a low network speed ratio of the target cell in a last week may be obtained.

In another implementation, the failure rate relative growth rate, the user disconnection ratio relative growth rate, and the low network speed ratio of the target cell may be obtained based on preset scene information.

For example, the preset scene information is a subway scene, and a failure rate relative growth rate, a user disconnection ratio relative growth rate, and a low network speed ratio of the target cell in the subway scene may be obtained.

Step S2: Determine that the target cell has a first abnormal attribute in a case that a sum of the failure rate relative growth rate and the user disconnection ratio relative growth rate of the target cell is greater than a first threshold.

In this step, the failure rate relative growth rate and the user disconnection ratio relative growth rate of the target cell are combined through adding, to represent the ratio information of the first-type network anomaly in the target cell.

Correspondingly, before this step, the obtained sum of the failure rate relative growth rate and the user disconnection ratio relative growth rate of the target cell is compared with preset ratio information (that is, the first threshold). If the sum of the failure rate relative growth rate and the user disconnection ratio relative growth rate of the target cell is greater than the first threshold, it is determined that the target cell has the first abnormal attribute. That is, the target cell is a cell in which a network disconnection anomaly frequently occurs, and is defined as a “highly abnormal cell” in this application.

In some embodiments, the first threshold is 30%.

In some embodiments, a value of the first threshold is actually adjusted as required, to limit a strict degree of the definition of the “highly abnormal cell”.

Step S3: Determine that the target cell has a second abnormal attribute in a case that the low network speed ratio of the target cell is greater than a second threshold.

Before this step, the obtained low network speed ratio of the target cell is compared with preset ratio information (that is, the second threshold). If the low network speed ratio of the target cell is greater than the second threshold, it is determined that the target cell has the second abnormal attribute. That is, the target cell is a cell in which a low-speed network anomaly frequently occurs, and is defined as a “low network speed cell” in this application.

In some embodiments, the second threshold is 50%.

In some embodiments, a value of the second threshold is actually adjusted as required, to limit a strict degree of the definition of the “low network speed cell”.

A third threshold may be set to define a low-speed network anomaly. That is, when a network speed is less than the third threshold, it is considered that a low-speed network anomaly occurs.

Referentially, the third threshold is 300 kilobytes per second (KB/S).

It can be learned that in this application, at least an abnormal cell having the first abnormal attribute and an abnormal cell having the second abnormal attribute may be identified. For the abnormal cell having the first abnormal attribute, when a network disconnection anomaly occurs, the electronic device cannot be connected to a network, and therefore a user cannot access the Internet normally. For the abnormal cell having the second abnormal attribute, when a low-speed network anomaly occurs, the electronic device may be connected to the network, but a network speed is extremely low, and therefore the user cannot access the Internet normally.

The target cell may have at least one of the first abnormal attribute or the second abnormal attribute.

The electronic device in this embodiment may be a user terminal device.

Correspondingly, before step S1, a server may obtain historical crowdsourcing data that includes a network anomaly reported by a large quantity of user terminal devices. The user terminal device may obtain the historical crowdsourcing data from the server, and then the historical crowdsourcing data is trained, so that the target cell has at least one of the first abnormal attribute or the second abnormal attribute.

The electronic device in this embodiment may be a server.

Correspondingly, before step S1, the server may obtain historical crowdsourcing data that includes a network anomaly reported by a large quantity of user terminal devices, and then the historical crowdsourcing data is trained, so that the target cell has at least one of the first abnormal attribute or the second abnormal attribute.

To ensure accurate evaluation of the target cell, the target cell in this embodiment needs to meet: a quantity of electronic devices accessed within one day is greater than or equal to 5.

In this way, in this embodiment of this application, based on historical data, for a network anomaly reported by a large quantity of user terminal devices for a target cell, a failure rate relative growth rate, a user disconnection ratio relative growth rate, and a low network speed ratio of the target cell may be obtained. A sum of the failure rate relative growth rate and the user disconnection ratio relative growth rate is used to represent ratio information of a network disconnection anomaly in the target cell, and the low network speed ratio is used to represent ratio information of a low-speed network anomaly in the target cell. Further, the two pieces of obtained ratio information are separately compared with a corresponding first threshold and a corresponding second threshold. Correspondingly, when one piece of ratio information is greater than a first threshold, it is considered that the target cell is more prone to a network disconnection anomaly, and it is determined that the target cell has a first abnormal attribute. When the other piece of ratio information is greater than a second threshold, it is considered that the target cell is more prone to a low-speed network anomaly, and it is determined that the target cell has a second abnormal attribute. It can be learned that based on the abnormal cell identification method in this application, at least two types of abnormal cells that have the first abnormal attribute and the second abnormal attribute can be more precisely identified. Compared with the prior art in which only one type of abnormal cell can be generally identified, this application greatly increases a coverage area of an abnormal cell.

In a procedure of the abnormal cell identification method in another embodiment of this application, after step S2, the method further includes:

Step A1: Forbid access to the target cell in a process of detecting that the electronic device accesses the target cell.

In this step, in a process of detecting that the electronic device accesses the target cell, if the target cell has the first abnormal attribute, the electronic device may be automatically set to disable the target cell.

In this embodiment, a network disconnection anomaly frequently occurs in the target cell. Because a network disconnection anomaly is not easy to evade, the target cell may be disabled to evade an abnormal cell, to ensure that a network disconnection anomaly does not frequently occur after the electronic device accesses the cell, thereby ensuring that the user can access the Internet normally.

In a procedure of the abnormal cell identification method in another embodiment of this application, step A1 includes:

Sub-step B1: Obtain target time information of the electronic device in the process of detecting that the electronic device accesses the target cell.

Sub-step B2: Forbid access to the target cell in a case that the target time information matches time information associated with the first abnormal attribute.

The target time information includes any one of morning time period information, noon time period information, or evening time period information, and/or any one of working day information or off day information.

Generally, for a cell, in different time periods in a day, for a device that accesses the cell, a frequency of reporting a network anomaly is different, and a type of the reported network anomaly is also different.

For example, for a cell, a quantity of devices accessed in a morning or evening peak period is relatively large, and a quantity of devices accessed in a noon time period is relatively small. Therefore, a frequency of reporting a network anomaly in the morning or evening time period is significantly greater than a frequency of reporting a network anomaly in the noon time period.

Therefore, in step S1, a failure rate relative growth rate and a user disconnection ratio relative growth rate of the target cell may be obtained based on a specific piece of time information.

The specific piece of time information may be any one of morning time period information, noon time period information, or evening time period information.

For example, 7:00-10:00 (morning time period information), 11:00-14:00 (noon time period information), and 17:00-20:00 (evening time period information) in a day may be divided to separately obtain failure rate relative growth rates and user disconnection ratio relative growth rates of the target cell in the three pieces of time information.

In addition, the specific piece of time information may be any one of working day information or off day information.

For another example, Monday-Friday (working day information) and Saturday-Sunday (off day information) in a week may be divided to obtain failure rate relative growth rates and user disconnection ratio relative growth rates of the target cell in the two pieces of time information.

Therefore, in this embodiment, after the target time information of the electronic device is obtained, if the target time information matches time information associated with the obtained failure rate relative growth rate and the obtained user disconnection ratio relative growth rate, it is considered that the electronic device is just within a time at which the target cell is prone to a network disconnection anomaly, and therefore the target cell is directly disabled.

The target time information is a corresponding assumed time after the target cell is accessed. Considering that a difference between a current time and a to-be-accessed time is extremely short, the target time information in this step may be understood as current time information.

In some embodiments, the target time information may be determined according to a current specific time point.

For example, the current specific time point is 7:30, and is determined as morning time period information. Based on an obtained failure rate relative growth rate and an obtained user disconnection ratio relative growth rate of the target cell in the morning time period information, it may be determined that the target cell has the first abnormal attribute in the morning time period information, and therefore the electronic device is forbidden from accessing the target cell.

In this embodiment, considering a time dimension, a plurality of pieces of time information are pre-divided to analyze a network disconnection anomaly in the target cell more precisely, so as to separately determine whether the target cell has the first abnormal attribute in different time information. Therefore, the electronic device may match, according to the current target time information, the time information associated with the case that the target cell has the first abnormal attribute, so that the electronic device can take corresponding measures according to different network conditions of the target cell in different time information, thereby more flexibly evading an abnormal cell.

In addition, based on this embodiment, accuracy of determining whether the target cell has the first abnormal attribute may be further improved. For example, a frequency of a network disconnection anomaly in the target cell in a day generally is not high, but a frequency of a network disconnection anomaly at sometime is relatively high. Based on this embodiment, the target cell is not directly determined as having no first abnormal attribute for an overall situation.

And/Or

Sub-step B3: Obtain target scene information of the electronic device in the process of detecting that the electronic device accesses the target cell.

Sub-step B4: Forbid access to the target cell in a case that the target scene information matches scene information associated with the first abnormal attribute.

The target scene information includes any one of high-speed railway scene information, subway scene information, high-speed scene information, or mall scene information.

Generally, for a cell, in different scenes, for a device that accesses the cell, a frequency of reporting a network anomaly is different, and a type of the reported network anomaly is also different.

For example, for a cell, a frequency of reporting a network anomaly in access of the electronic device in a scene such as a high-speed railway, a metro, a mall, or a high-speed scene is obviously greater than a frequency of reporting a network anomaly in access of the electronic device in another scene.

Therefore, in step S1, a failure rate relative growth rate and a user disconnection ratio relative growth rate of the target cell may be obtained based on a specific piece of scene information.

The specific piece of scene information may be any one of high-speed railway scene information, subway scene information, high-speed scene information, or mall scene information.

For example, failure rate relative growth rates and user disconnection ratio relative growth rates of the target cell in the four pieces of scene information are separately obtained.

Therefore, in this embodiment, after the target scene information of the electronic device is obtained, if the target scene information matches scene information associated with the obtained failure rate relative growth rate and the obtained user disconnection ratio relative growth rate, it is considered that the electronic device is just in a scene in which the target cell is prone to a network disconnection anomaly, and therefore the target cell is directly disabled.

Considering that a difference between a current time and a to-be-accessed time is extremely short, the target scene information in this step may be understood as current scene information.

In some embodiments, the target scene information may be determined according to a current specific location.

For example, the current specific location is XX expressway, and is determined as high-speed scene information. Based on an obtained failure rate relative growth rate and an obtained user disconnection ratio relative growth rate of the target cell in the high-speed scene information, it may be determined that the target cell has the first abnormal attribute in the high-speed scene information, and therefore the target cell is disabled on the electronic device.

In this embodiment, considering a spatial dimension, a plurality of pieces of scene information are pre-divided to analyze a network disconnection anomaly in the target cell more precisely, and it may be separately determined whether the target cell has the first abnormal attribute in different scene information. Therefore, the electronic device may match, according to the current target scene information, the scene information associated with the case that the target cell has the first abnormal attribute, so that the electronic device can take corresponding measures according to different network conditions of the target cell in different scenes, thereby more flexibly evading an abnormal cell.

In addition, based on this embodiment, accuracy of determining whether the target cell has the first abnormal attribute may be further improved. For example, a frequency of a network disconnection anomaly in the target cell in each scene generally is not high, but a frequency of a network disconnection anomaly in some scenes is relatively high. Based on this embodiment, the target cell is not directly determined as having no first abnormal attribute for an overall situation.

It should be noted that in this embodiment, a failure rate relative growth rate and a user disconnection ratio relative growth rate may be obtained for only a specific piece of time information or a specific piece of scene information, or may be obtained for a specific piece of time information and a specific piece of scene information.

In a procedure of the abnormal cell identification method in another embodiment of this application, after step S3, the method further includes:

Step C1: Access the target cell and set a connection mode of the electronic device to a dual connectivity mode in a process of detecting that the electronic device accesses the target cell.

In this step, in the process of detecting that the electronic device accesses the target cell, if the target cell has the second abnormal attribute, the electronic device may be automatically set to the dual connectivity mode.

In this embodiment, the target cell is in New Radio 5G Non-standalone (NR5G-NSA). Correspondingly, the setting a connection mode of the electronic device to a dual connectivity mode is: enabling an E-UTRAN New Radio-Dual Connectivity (EN-DC) mode in the electronic device.

In this embodiment, a corresponding measure is provided for a low-speed network anomaly.

Currently, some cells are configured with a New Radio 5G standalone (NR5G-SA) device, and some cells are configured with an NR5G-NSA device. For the latter, after some 4G electronic devices are accessed, a low-speed network anomaly occurs in the 4G electronic devices due to impact of a 5G electronic device accessed together, and therefore a low-speed network anomaly is reported.

An NR5G-NSA cell is an anchor cell of various operators. Therefore, in a case that the target cell is an anchor cell, it may be determined whether the target cell has the second abnormal attribute, and the target cell is accessed and EN-DC is enabled in a case that the target cell has the second abnormal attribute, to allow devices to simultaneously access Long Term Evaluation (LTE, a 4G mobile network) and 5G on a same frequency band.

In this embodiment, for a target cell in which a low-speed network anomaly frequently occurs, the target cell may be accessed for some characteristics of the target cell, and in addition, a dual connectivity mode is enabled in the electronic device, to improve a network speed on the electronic device, thereby ensuring that the user can normally use the electronic device.

In a procedure of the abnormal cell identification method in another embodiment of this application, step C1 includes:

Sub-step D1: Obtain target time information of the electronic device in the process of detecting that the electronic device accesses the target cell.

Sub-step D2: In a case that the target time information matches time information associated with the second abnormal attribute, access the target cell and set the connection mode of the electronic device to the dual connectivity mode.

The target time information includes any one of morning time period information, noon time period information, or evening time period information, and/or any one of working day information or off day information.

Generally, for a cell, in different time periods in a day, for a device that accesses the cell, a frequency of reporting a network anomaly is different, and a type of the reported network anomaly is also different.

For example, for a cell, a quantity of devices accessed in a morning or evening peak period is relatively large, and a quantity of devices accessed in a noon time period is relatively small. Therefore, a frequency of reporting a network anomaly in the morning or evening time period is significantly greater than a frequency of reporting a network anomaly in the noon time period.

Therefore, in step S1, a low network speed ratio of the target cell may be obtained based on a specific piece of time information.

The specific piece of time information may be any one of morning time period information, noon time period information, or evening time period information.

For example, 7:00-10:00 (morning time period information), 11:00-14:00 (noon time period information), and 17:00-20:00 (evening time period information) in a day may be divided to separately obtain low network speed ratios of the target cell in the three pieces of time information.

In addition, the specific piece of time information may be any one of working day information or off day information.

For another example, Monday-Friday (working day information) and Saturday-Sunday (off day information) in a week may be divided to obtain low network speed ratios of the target cell in the two pieces of time information.

Therefore, in this embodiment, after the target time information of the electronic device is obtained, if the target time information matches time information associated with the obtained low network speed ratio, it is considered that the electronic device is just within a time at which the target cell is prone to a low-speed network anomaly, and therefore the target cell is accessed and the dual connectivity mode is set on the electronic device.

The target time information is a corresponding assumed time after the target cell is accessed. Considering that a difference between a current time and a to-be-accessed time is extremely short, the target time information in this step may be understood as current time information.

In some embodiments, the target time information may be determined according to a current specific time point.

For example, the current specific time point is 7:30, and is determined as morning time period information. Based on an obtained low network speed ratio of the target cell in the morning time period information, it may be determined that the target cell has the second abnormal attribute in the morning time period information, and therefore the target cell is accessed and the dual connectivity mode is set on the electronic device.

In this embodiment, considering a time dimension, a plurality of pieces of time information are pre-divided to analyze a low-speed network anomaly in the target cell more precisely, so as to separately determine whether the target cell has the second abnormal attribute in different time information. Therefore, the electronic device may match, according to the current target time information, the time information associated with the case that the target cell has the second abnormal attribute, so that the electronic device can take corresponding measures according to different network conditions of the target cell in different time information, thereby more flexibly evading an abnormal cell.

In addition, based on this embodiment, accuracy of determining whether the target cell has the second abnormal attribute may be further improved. For example, a frequency of a low-speed network anomaly in the target cell in a day generally is not high, but a frequency of a low-speed network anomaly at some time is relatively high. Based on this embodiment, the target cell is not directly determined as having no second abnormal attribute for an overall situation.

And/Or

Sub-step D3: Obtain target scene information of the electronic device in the process of detecting that the electronic device accesses the target cell.

Sub-step D4: In a case that the target scene information matches scene information associated with the second abnormal attribute, access the target cell and set the connection mode of the electronic device to the dual connectivity mode.

The target scene information includes any one of high-speed railway scene information, subway scene information, high-speed scene information, or mall scene information.

Generally, for a cell, in different scenes, for a device that accesses the cell, a frequency of reporting a network anomaly is different, and a type of the reported network anomaly is also different.

For example, for a cell, a frequency of reporting a network anomaly in access of the electronic device in a scene such as a high-speed railway, a metro, a mall, or a high-speed scene is obviously greater than a frequency of reporting a network anomaly in access of the electronic device in another scene.

Therefore, in step S1, a low network speed ratio of the target cell may be obtained based on a specific piece of scene information.

The specific piece of scene information may be any one of high-speed railway scene information, subway scene information, high-speed scene information, or mall scene information.

For example, low network speed ratios of the target cell in the four pieces of scene information are separately obtained.

Therefore, in this embodiment, after the target scene information of the electronic device is obtained, if the target scene information matches scene information associated with the obtained low network speed ratio, it is considered that the electronic device is just in a scene in which the target cell is prone to a low-speed network anomaly, and therefore the target cell is accessed and the connection mode of the electronic device is set to the dual connectivity mode.

The target scene information is corresponding assumed scene information after the target cell is accessed. Considering that a difference between a current time and a to-be-accessed time is extremely short, the target scene information in this step may be understood as current scene information.

In some embodiments, the target scene information may be determined according to a current specific location.

For example, the current specific location is XX expressway, and is determined as high-speed scene information. Based on an obtained low network speed ratio of the target cell in the high-speed scene information, it may be determined that the target cell has the second abnormal attribute in the high-speed scene information, and therefore the target cell is accessed and the connection mode of the electronic device is set to the dual connectivity mode.

In this embodiment, considering a spatial dimension, a plurality of pieces of scene information are pre-divided to analyze a low-speed network anomaly in the target cell more precisely, and it may be separately determined whether the target cell has the second abnormal attribute in different scene information. Therefore, the electronic device may match, according to the current target scene information, the scene information associated with the case that the target cell has the second abnormal attribute, so that the electronic device can take corresponding measures according to different network conditions of the target cell in different scenes, thereby more flexibly evading an abnormal cell.

In addition, based on this embodiment, accuracy of determining whether the target cell has the second abnormal attribute may be further improved. For example, a frequency of a low-speed network anomaly in the target cell in each scene generally is not high, but a frequency of a low-speed network anomaly in some scenes is relatively high. Based on this embodiment, the target cell is not directly determined as having no second abnormal attribute for an overall situation.

It should be noted that in this embodiment, a low network speed ratio may be obtained for only a specific piece of time information or a specific piece of scene information, or may be obtained for a specific piece of time information and a specific piece of scene information.

Based on the foregoing embodiment, firstly, in this application, an abnormal cell may be identified for more network anomalies, to increase coverage of an abnormal cell. Secondly, in this application, different measures may be taken for different network anomalies, to evade an abnormal cell or evade a network anomaly in an abnormal cell, thereby improving Internet access experience of the user more flexibly. Thirdly, in this application, an abnormal cell may be selectively evaded at some times and in some scenes, avoid blind evasion.

There are three cases for evaluating the target cell: In a first case, the target cell has only the first abnormal attribute, and a corresponding measure is direct disabling. In a second case, the target cell has only the second abnormal attribute, and a corresponding measure is accessing and setting the dual connectivity mode on the electronic device. In a third case, the target cell has both the first abnormal attribute and the second abnormal attribute, and a disabling measure is preferentially adopted, to preferentially consider a network disconnection anomaly.

It should be noted that, when the electronic device accesses the target cell for a plurality of times, time information and scene information of the electronic device may be different. Therefore, the foregoing embodiments are all described for single access, and during next access, it may be re-determined whether a corresponding measure needs to be taken to evade an abnormal cell or evade a network anomaly in an abnormal cell.

In addition, in the foregoing embodiment, in the process of detecting that the electronic device accesses the target cell, that is, before the target cell is accessed, a corresponding measure is taken in a timely manner based on an abnormal attribute of the target cell. In more embodiments, after it is detected that the electronic device has just accessed the target cell and before network data is transmitted, a corresponding measure may be taken in a timely manner based on an abnormal attribute of the target cell. In any one of the foregoing embodiments, before performing network data transmission, the electronic device can access an ideal cell in a timely manner, thereby improving Internet access experience of the user.

In some embodiments, in the foregoing process of detecting that the electronic device accesses the target cell, the steps implemented in each embodiment are performed by a user terminal device by default.

In a procedure of the abnormal cell identification method in another embodiment of this application, step S1 includes:

Sub-step E1: Obtain a failure rate and a user disconnection ratio of the target cell according to a disconnection event of the target cell.

Formulas used in this step include:

Failure rate=Total quantity of disconnection times/Total quantity of accessed devices. Formula 1:

User disconnection ratio=Total quantity of disconnected devices/Total quantity of accessed devices. Formula 2:

In formula 1, the total quantity of disconnection times represents a total quantity of times that a network disconnection anomaly is reported by all devices that access the target cell in a first time period.

In formula 2, the total quantity of disconnected devices represents a quantity of devices that report a network disconnection anomaly in all devices that access the target cell in the first time period.

In formula 1 and formula 2, the total quantity of accessed devices represents a quantity of all devices that access the target cell in the first time period.

Identification information is unique for a same device, which may be considered as one device.

It should be noted that, for a same device, if the device accesses the target cell for a plurality of times on a same day, only a quantity of accessed devices on the day is occupied. If the device accesses the target cell every day on different days, a quantity of accessed devices every day is separately occupied. In some embodiments, if the device reports a network disconnection anomaly for a plurality of times on a same day, only a quantity of disconnection times on the day is occupied; or if the device reports a network disconnection anomaly every day on different days, a quantity of disconnection times every day is separately occupied.

For example, the first time period may be within a last week. In formula 1 and formula 2, the total quantity of accessed devices is used to represent a total quantity of all devices that access the target cell within a week. For a specific day, a device accesses the target cell for a plurality of times, and the device occupies one total quantity of accessed devices on the day. For two consecutive days, a device separately accesses the target cell, and the device occupies two total quantities of accessed devices within the two days.

For another example, the first time period may be within a last week. In formula 2, the total quantity of disconnected devices is used to represent a total quantity of all devices that report a network disconnection anomaly within a week. For a specific day, a device reports a network disconnection anomaly for a plurality of times, and the device occupies a total quantity of disconnected devices on the day. For two consecutive days, a device separately reports a network disconnection anomaly, and the device occupies two total quantities of disconnected devices within the two days.

In this step, two parameters, namely, the failure rate and the user disconnection ratio of the target cell, are separately obtained, thereby effectively avoiding interference caused by a personal device.

In addition, in this embodiment, a quantity of a single item is not directly used, but a ratio of a quantity of a single item to a total quantity is used, and an overall situation is combined to accurately evaluate an actual situation.

For example, if 100 disconnections occur, 100 devices is accessed to a cell 1, and 10,000 devices is accessed to a cell 2, it is obvious that the cell 2 is better than the cell 1.

Sub-step E2: Obtain a total failure rate and a total user disconnection ratio of a target region range according to a disconnection event of the target region range in which the target cell is located.

In some embodiments, a city is used as the target region range to determine whether the target cell is an abnormal cell compared with an overall situation of the city.

In some embodiments, in this step, the total failure rate and the total user disconnection ratio of the target region range are obtained by using formula 1 and formula 2.

Sub-step E3: Obtain the failure rate relative growth rate of the target cell according to the failure rate and the total failure rate, and obtain the user disconnection ratio relative growth rate of the target cell according to the user disconnection ratio and the total user disconnection ratio.

Formulas used in this step include:

Failure rate relative growth rate=(Failure rate−Total failure rate)/Total failure rate. Formula 3:

User disconnection ratio relative growth rate=(User disconnection ratio−Total user disconnection ratio)/Total user disconnection ratio. Formula 4:

In this embodiment, based on an overall situation in the target region range in which the target cell is located, a relatively frequent degree of a network disconnection anomaly in the target cell is obtained, thereby providing a regional comparison method, so that a final obtained determining result is more meaningful.

In this step, a result is obtained by adding the failure rate relative growth rate and the user disconnection ratio relative growth rate, and the result may be used to evaluate a probability that a network disconnection anomaly event occurs after the electronic device accesses the target cell.

In this embodiment, a method for obtaining the failure rate relative growth rate and the user disconnection ratio relative growth rate of the target cell is provided. In this method, firstly, based on a quantity of disconnection events and a quantity of devices that report a disconnection event, a network disconnection anomaly is evaluated, and interference caused by a personal device to the evaluation is excluded. Secondly, a total quantity of accessed devices is used to evaluate a network disconnection anomaly by using a ratio, to avoid direct use of a specific parameter, which is not representative. Thirdly, an absolute value result of the target cell obtained through calculation is combined with an overall situation of a region, to obtain a relative value result, so that interference caused by an overall region anomaly to the evaluation is excluded. In view of the above, based on the foregoing method, it can be effectively and accurately determined whether the target cell is an abnormal cell in which a disconnection phenomenon frequently occurs.

It should be noted that the foregoing method is also applicable to obtaining a failure rate relative growth rate and a user disconnection ratio relative growth rate of a specific piece of time information (or a specific piece of scene information). For example, a failure rate relative growth rate and a user disconnection ratio relative growth rate of corresponding time information (for example, morning time period information) in the first time period may be obtained. For another example, a failure rate relative growth rate and a user disconnection ratio relative growth rate of corresponding scene information (for example, subway scene information) in the first time period may be obtained.

Sub-step E4: Obtain a quantity of access times at a low network speed and a total quantity of access times of the target cell according to an event that a network speed of the target cell is less than a third threshold.

Sub-step E5: Determine a ratio of the quantity of access times at a low network speed to the total quantity of access times as the low network speed ratio.

A formula used in this step includes:

Low network speed ratio=Quantity of access times at a low network speed/Total quantity of access times. Formula 5:

In formula 5, the quantity of access times at a low network speed represents a total quantity of times that a low-speed network anomaly is reported by all devices that access the target cell in the first time period, and the total quantity of access times represents a total quantity of times that all devices access the target cell in the first time period.

In this step, a result is obtained by comparing the quantity of access times at a low network speed with the total quantity of access times, and the result may be used to evaluate a probability that a low-speed network anomaly event occurs after the electronic device accesses the target cell.

It should be noted that the foregoing method is also applicable to obtaining a low network speed ratio of a specific piece of time information (or a specific piece of scene information). For example, a low network speed ratio of corresponding time information (for example, morning time period information) in the first time period may be obtained. For another example, a low network speed ratio of corresponding scene information (for example, subway scene information) in the first time period may be obtained.

In this embodiment, a method for obtaining the low network speed ratio of the target cell is provided. In this method, the low network speed ratio is obtained based on a quantity of times of reporting a low-speed network anomaly and a total quantity of times that all devices access the target cell to evaluate a low-speed network anomaly, to avoid direct use of a specific parameter, which is not representative. This can effectively and accurately determine whether the target cell is an abnormal cell in which a low network speed phenomenon frequently occurs.

In this embodiment, the first time period may be a time period of a last week, and a data amount of one week can prevent the obtained result from being accidental, and can also avoid processing of too much historical data.

In the abnormal cell identification method in another embodiment of this application, when it is determined, based on the method in the foregoing embodiment, that the target cell has a specific abnormal attribute in a specific piece of time information (or a specific piece of scene information), for further verification, it may be further determined, based on the method in the foregoing embodiment, whether the target cell has then abnormal attribute except in a remaining time (or a remaining scene) except the time information (or the scene information). If the target cell does not have the abnormal attribute in the remaining time (or the remaining scene) except the time information (or the scene information), it is further verified that the target cell has a specific abnormal attribute in a specific piece of time information (or a specific piece of scene information).

For example, for morning time period information, a remaining time except the time period is all time in a day except three hours of the morning time period. For another example, for off day information, a remaining time except the time period is all time except Saturday and Sunday in a week.

For example, if a sum of a failure rate relative growth rate and a user disconnection ratio relative growth rate corresponding to the remaining time is less than 15%, it is determined that the target cell has an obvious highly abnormal phenomenon in the corresponding time information, that is, has the first abnormal attribute.

For example, if a low network speed ratio corresponding to the remaining time is less than 35%, it is determined that the target cell has an obvious low network speed phenomenon at the corresponding time, that is, the second abnormal attribute.

Therefore, based on the foregoing verification, in a case that it is determined that the target cell has an abnormal attribute, the abnormal attribute may further have a time characteristic, that is, an obvious abnormal phenomenon exists in a specific piece of time information, and is relatively normal at another time; and/or in a case that it is determined that the target cell has an abnormal attribute, the abnormal attribute may further have a spatial characteristic, that is, an obvious abnormal phenomenon exists in a specific piece of scene information, and is relatively normal in another scene.

In another embodiment of this application, a method for generating an abnormal cell list may be provided with reference to the foregoing embodiments, so that the electronic device can directly determine an attribute of the target cell from the abnormal cell list.

TABLE 1

| | Cell identifier | | | | Time condition (hour) | | | Time condition (day) | | Spatial condition | | | | | |
|---|---|---|---|---|---|---|---|---|---|---|---|---|---|---|---|
| PLMN | RAT | TAC | CELLID | PCI | Morning | Noon | Evening | Working day | Off day | Subway | High-speed railway | High speed | Mall | Type | Action |
| 46000 | LTE | 9443 | 53476012 | 8 | Yes | No | Yes | No | No | No | No | No | No | Highly abnormal | Disable the cell |
| 46001 | LTE | 9739 | 102434325 | 304 | Yes | No | Yes | No | No | No | Yes | No | No | Low network speed | Enable EN-DC |
| 46011 | NR5G-NSA | 29997 | 219180850 | 493 | No | No | No | Yes | No | Yes | No | No | No | Highly abnormal | Disable the cell |
| . . . | . . . | . . . | . . . | . . . | | | | | | | | | | | |

The following uses the scheme shown in Table 1 as an example to describe this embodiment in detail.

Table 1 is a combination of a first table, a second table, and a third table.

In the first table, an overall result may be obtained for a network anomaly of each cell in a city in the first time period. That is, in this table, interference caused by factors such as time and space to a network anomaly of a cell is not considered.

In the second table, a result corresponding to each piece of time information may be obtained for a network anomaly of each cell in a city in different time information (for example, morning time period information) the first time period. Generally, a network anomaly of a cell is relatively related to human traffic, and different human traffic may be reflected by using a time dimension, so that results corresponding to two pieces of time information such as an off day and a working day and results corresponding to three pieces of time information such as morning, noon, and evening can be separately obtained.

In the third table, a result corresponding to each piece of scene information may be obtained for a network anomaly of each cell in a city in different scene information (for example, high-speed railway scene information) in the first time period. Generally, a network anomaly of a cell is relatively related to a scene in which a person is located, and different scenes may be reflected by using a spatial dimension, so that results corresponding to four pieces of scene information such as a subway, a high-speed railway, a high-speed scene, and a mall can be separately obtained.

Further, the three tables are combined. An example of a combination process is as follows: If one cell appears only in the first table, a corresponding time condition (hour), a corresponding time condition, and a corresponding spatial condition are all "No" after the combination; if one cell appears in the first table and the second table or only the second table, at least one of a corresponding time condition (hour) or a corresponding time condition (day) is "Yes" and a corresponding spatial condition is "No" after the combination; if one cell appears in the first table and the third table or only the third table, at least one condition in a corresponding spatial condition is "Yes" and both a corresponding time condition (hour) and a corresponding time condition (day) are "No" after the combination; or if one cell respectively appears in the second table and the third table or the three tables, at least one of a corresponding time condition (hour) and/or a corresponding time condition (day) is "Yes", and at least one condition in a corresponding spatial condition is "Yes" after the combination.

For example, when it is learned, based on a specific piece of time information, that any cell has the first abnormal attribute, some of corresponding time conditions are "Yes" and a corresponding type is "highly abnormal" in a row in which the cell is located in Table 1.

For another example, when it is learned, based on a specific piece of scene information, that any cell has the second abnormal attribute, an item in corresponding spatial condition is "Yes" and a corresponding type is "low network speed" in a row in which the cell is located in Table 1.

For example, a server may generate the abnormal cell list, and then deliver the abnormal cell list to a user terminal device, so that when the user terminal device is about to access the target cell, the user terminal device identifies the target cell in the abnormal cell list according to current time and spatial characteristics of the user terminal device, and determines whether a time condition and a spatial condition corresponding to the target cell are met, to further determine whether a corresponding action needs to be performed.

In a solution, when it is determined whether the time condition and the spatial condition corresponding to the target cell are met, if at least one of the time condition (hour), the time condition (day), or the spatial condition is met, it indicates that a corresponding action needs to be performed, to evade an abnormal cell in more actual situations or evade a network anomaly in an abnormal cell.

For example, in a second cell in Table 1, "Yes" appears in both the time condition (hour) and the spatial condition, and if at least one of the time condition (hour) or the spatial condition is met according to current time and spatial characteristics of the cell, it indicates that a corresponding action needs to be performed.

In another solution, when it is determined whether the time condition and the spatial condition corresponding to the target cell are met, if three of the time condition (hour), the time condition (day), and the spatial condition are met, it indicates that a corresponding action needs to be performed, to help the user evade an abnormal cell in a more accurate actual situation, thereby reducing a probability of incorrect action execution.

For example, in a second cell in Table 1, "Yes" appears in both the time condition (hour) and the spatial condition, and if both the time condition (hour) and the spatial condition are met according to current time and spatial characteristics of the cell, it indicates that a corresponding action needs to be performed.

For sub-conditions in any one type of condition, for example, three sub-conditions "Morning, Noon, and Evening" in the time condition (hour), if it is determined that one of the three sub-conditions is met, it is considered that the type of condition is met.

For example, in a first cell in Table 1, sub-conditions "Morning and Evening" of the time condition (hour) are "Yes", and if any one of the sub-conditions "Morning and Evening" is met according to a current time characteristic of the cell, it is considered that the time condition (hour) is met.

It can be learned that in Table 1, there may be an "and" relationship or an "or" relationship between the time condition (hour), the time condition (day), and the spatial condition. For several cells listed in Table 1, if corresponding actions are to be performed, based on time characteristics and spatial characteristics of the cells, a first cell needs to meet a condition [Morning or Evening], a second cell needs to meet a condition [(Morning or Evening) and High-speed railway] and a third cell needs to meet a condition [Working day and Subway].

In addition, in Table 1, each cell is identified by using a cell identifier. The cell identifier includes information such as a Public Land Mobile Network (PLMN), a Radio Access Type (RAT), a Tracking Area Code (TAC), a cell ID, and a Physical Cell Identifier (PCI).

In this embodiment, different actions are performed for different anomaly types based on a dimension of a network anomaly type. In addition, based on two dimensions of time and space that have impact on a network anomaly, an abnormal cell is analyzed more precisely and more abnormal cells are discovered, and therefore a fine and comprehensive abnormal cell list can be generated, so that the electronic device can reasonably perform a corresponding action based on the abnormal cell list, to evade an abnormal cell or evade a network anomaly in an abnormal cell.

In more embodiments of this application, if the historical crowdsourcing data is sufficient, a table may further be added. In this table, a corresponding abnormal cell may be screened out based on a device model. Further, the table is combined into Table 1, to perform more granular network anomaly analysis on listed abnormal cells. In addition, coverage of an abnormal cell can be further increased.

In addition, in a process of generating the abnormal cell list, cells in an anchor cell list of various operators may be obtained, to obtain a low network speed ratio in each cell, thereby ensuring validity of subsequently setting the dual connectivity mode on the electronic device.

In view of above, a network anomaly in the electronic device sometimes is not caused by a signal or a device, and may be a problem in a cell accessed by the electronic device. Therefore, network experience of the user can be improved by using some simple strategies. For example, a set of generalization rules is locally set, and some abnormal cells are identified by using historical big data on the background and delivered to the electronic device by using the server, to ensure that the electronic device accesses another cell before a network anomaly occurs, thereby performing evasion.

In the prior art, various measures may be are mainly taken for a network anomaly such as a disconnection and may be finally classified into reselecting a cell (forbidding a cell, forbidding a frequency, and the like). However, with the development of 5G, especially emergence of NR5G-NSA, many 4G anchor cells that can access the Internet but have a low network speed appear (because resources are shared by 5G cells). For these cells, other measures can also be taken to improve network experience of the user. In addition, cell quality is strongly related to time and space. For example, some cells in a subway station may be abnormal due to high human traffic in a morning or evening peak period, but are normal in other time periods. If statistics is simply performed based on big data, there will be two results for these cells: (1) Because there is only a high anomaly in a few time periods but an overall index is not high, an anomaly is not identified at last. (2) Even if there is only a high anomaly in a few time periods but an overall index is still high, the electronic equipment disables these normal cells during an off-peak period. In this way, not only an abnormal cell is not evaded, but also user equipment may be directed from a normal cell to an abnormal cell.

Compared with the prior art, in this application, firstly, not only a network disconnection anomaly is considered, but also a low-speed network anomaly is considered, to increase coverage of an abnormal cell. Secondly, different measures are taken for different types of network anomalies to effectively evade the anomalies. Thirdly, impact of a time dimension and a space dimension is considered, and an abnormal cell can be evaded more precisely.

It should be noted that the abnormal cell identification method provided in the embodiments of this application may be performed by an abnormal cell identification apparatus, or a control module that is in the abnormal cell identification apparatus and that is used to perform the abnormal cell identification method. In the embodiments of this application, that the abnormal cell identification apparatus performs the abnormal cell identification method is used as an example to describe the abnormal cell identification apparatus provided in the embodiments of this application.

Figure 2:
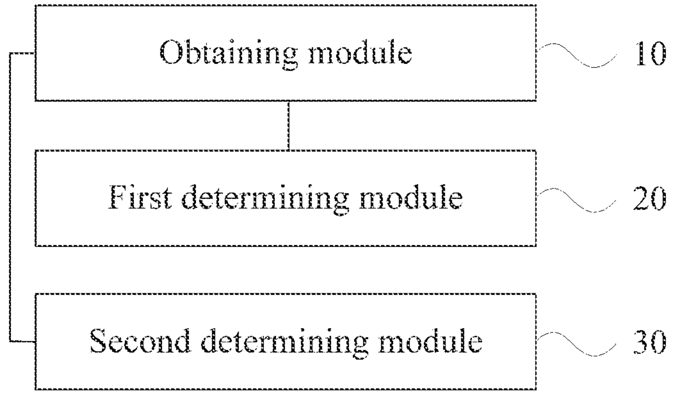
FIG. 2 is a block diagram of an abnormal cell identification apparatus according to an embodiment of this application.

FIG. 2 is a block diagram of an abnormal cell identification apparatus according to another embodiment of this application. The apparatus includes:

an obtaining module 10, configured to obtain a failure rate relative growth rate, a user disconnection ratio relative growth rate, and a low network speed ratio of a target cell, where the failure rate relative growth rate, the user disconnection ratio relative growth rate, and the low network speed ratio are all associated with at least one of time information or scene information;

a first determining module 20, configured to determine that the target cell has a first abnormal attribute in a case that a sum of the failure rate relative growth rate and the user disconnection ratio relative growth rate of the target cell is greater than a first threshold; and a second determining module 30, configured to determine that the target cell has a second abnormal attribute in a case that the low network speed ratio of the target cell is greater than a second threshold.

In this way, in this embodiment of this application, based on historical data, for a network anomaly reported by a large quantity of user terminal devices for a target cell, a failure rate relative growth rate, a user disconnection ratio relative growth rate, and a low network speed ratio of the target cell may be obtained. A sum of the failure rate relative growth rate and the user disconnection ratio relative growth rate is used to represent ratio information of a network disconnection anomaly in the target cell, and the low network speed ratio is used to represent ratio information of a low-speed network anomaly in the target cell. Further, the two pieces of obtained ratio information are separately compared with a corresponding first threshold and a corresponding second threshold. Correspondingly, when one piece of ratio information is greater than a first threshold, it is considered that the target cell is more prone to a network disconnection anomaly, and it is determined that the target cell has a first abnormal attribute. When the other piece of ratio information is greater than a second threshold, it is considered that the target cell is more prone to a low-speed network anomaly, and it is determined that the target cell has a second abnormal attribute. It can be learned that based on the abnormal cell identification method in this application, at least two types of abnormal cells that have the first abnormal attribute and the second abnormal attribute can be more precisely identified. Compared with the prior art in which only one type of abnormal cell can be generally identified, this application greatly increases a coverage area of an abnormal cell.

In some embodiments, the apparatus further includes:

a first execution module, configured to forbid access to the target cell in a process of detecting that the electronic device accesses the target cell.

In some embodiments, the first execution module includes:

a first obtaining unit, configured to obtain target time information of the electronic device in the process of detecting that the electronic device accesses the target cell; and a first matching unit, configured to forbid access to the target cell in a case that the target time information matches time information associated with the first abnormal attribute, where the target time information includes any one of morning time period information, noon time period information, or evening time period information, and/or any one of working day information or off day information, and/or a second obtaining unit, configured to obtain target scene information of the electronic device in the process of detecting that the electronic device accesses the target cell; and a second matching unit, configured to forbid access to the target cell in a case that the target scene information matches scene information associated with the first abnormal attribute, where the target scene information includes any one of high-speed railway scene information, subway scene information, high-speed scene information, or mall scene information.

In some embodiments, the apparatus further includes:

a second execution module, configured to access the target cell and set a connection mode of the electronic device to a dual connectivity mode in a process of detecting that the electronic device accesses the target cell.

In some embodiments, the second execution module includes:

a third obtaining unit, configured to obtain target time information of the electronic device in the process of detecting that the electronic device accesses the target cell, and a third matching unit, configured to: in a case that the target time information matches time information associated with the second abnormal attribute, access the target cell and set the connection mode of the electronic device to the dual connectivity mode, where the target time information includes any one of morning time period information, noon time period information, and evening time period information, and/or any one of working day information and off day information;

and/or a fourth obtaining unit, configured to obtain target scene information of the electronic device in the process of detecting that the electronic device accesses the target cell; and a fourth matching unit, configured to: in a case that the target scene information matches scene information associated with the second abnormal attribute, access the target cell and set the connection mode of the electronic device to the dual connectivity mode, where the target scene information includes any one of high-speed railway scene information, subway scene information, high-speed scene information, and mall scene information. In some embodiments, the obtaining module 10 includes:

a fifth obtaining unit, configured to obtain a failure rate and a user disconnection ratio of the target cell according to a disconnection event of the target cell;

a sixth obtaining unit, configured to obtain a total failure rate and a total user disconnection ratio of a target region range according to a disconnection event of the target region range in which the target cell is located;

a seventh obtaining unit, configured to obtain the failure rate relative growth rate of the target cell according to the failure rate and the total failure rate, and obtain the user disconnection ratio relative growth rate of the target cell according to the user disconnection ratio and the total user disconnection ratio;

an eighth obtaining unit, configured to obtain a quantity of access times at a low network speed and a total quantity of access times of the target cell according to an event that a network speed of the target cell is less than a third threshold; and a ratio determining unit, configured to determine a ratio of the quantity of access times at a low network speed to the total quantity of access times as the low network speed ratio.

The abnormal cell identification apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a Network Attached Storage (NAS), a personal computer (PC), a television (TV), an automated teller machine, or a self-service machine. This is not specifically limited in the embodiments of this application.

The abnormal cell identification apparatus in this embodiment of this application may be an apparatus with an operating system. The operating system may be an Android operating system, an iOS operating system, or another possible operating system. This is not specifically limited in this embodiment of this application.

The abnormal cell identification apparatus provided in this embodiment of this application can implement the processes implemented in the foregoing method embodiment. To avoid repetition, details are not described herein again.

Figure 3:
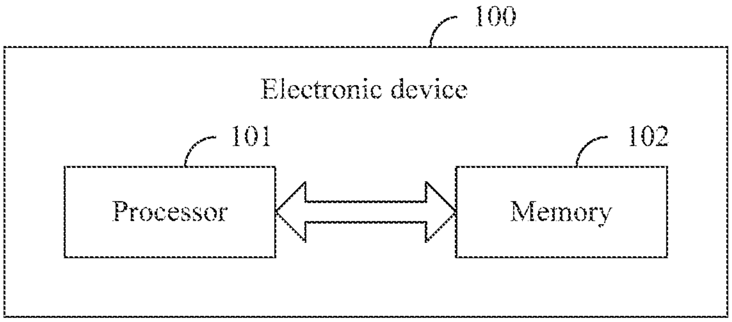
FIG. 3 is a first schematic structural diagram of hardware of an electronic device according to an embodiment of this application.

As shown in FIG. 3, an embodiment of this application further provides an electronic device 100, including a processor 101, a memory 102, and a program or an instruction that is stored in the memory 102 and that can be run on the processor 101. When the program or the instruction is executed by the processor 101, the processes of any one of the foregoing abnormal cell identification method embodiments are implemented and a same technical effect can be achieved. To avoid repetition, details are not described herein again.

It should be noted that the electronic device in this embodiment of this application includes the foregoing mobile electronic device and the foregoing non-mobile electronic device.

Figure 4:
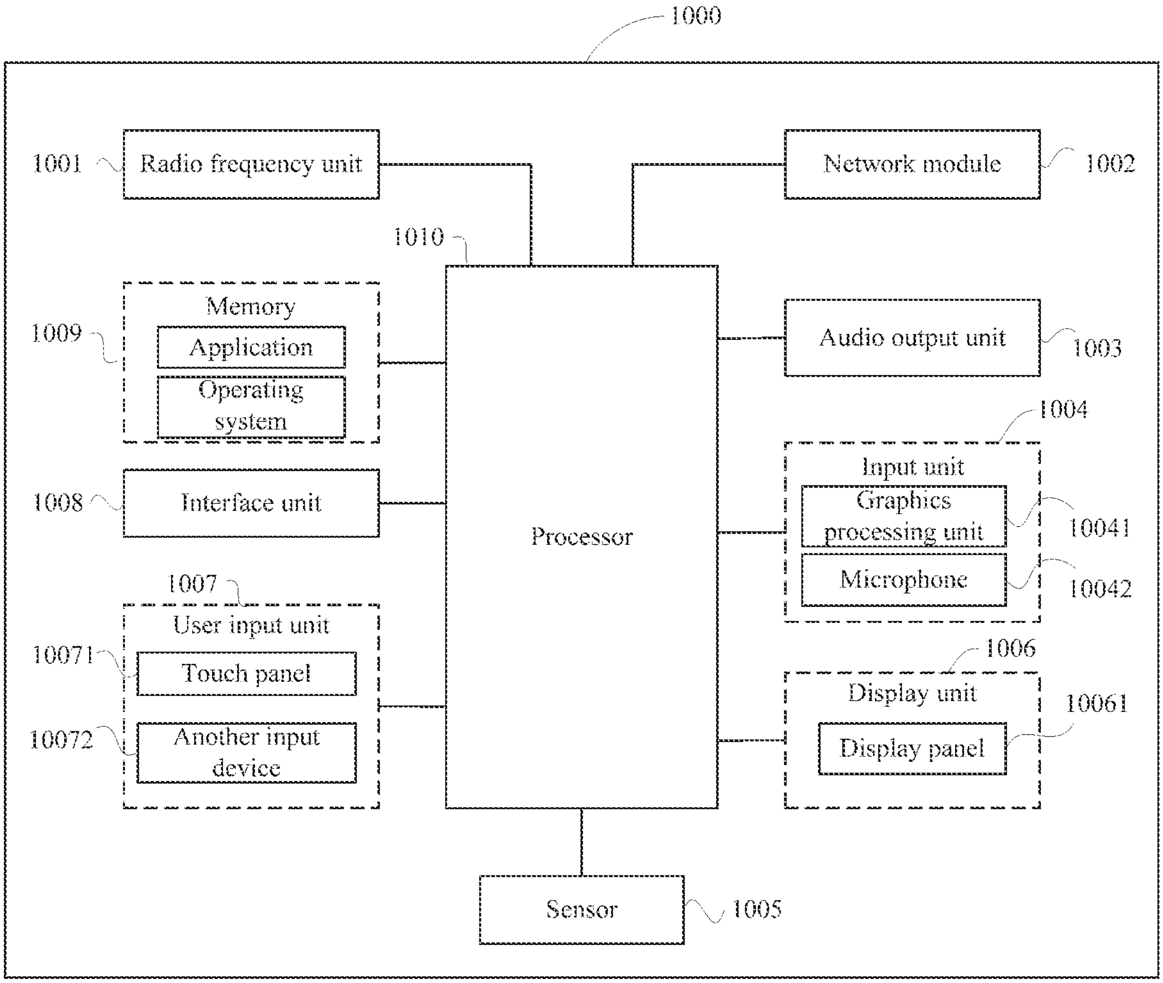
FIG. 4 is a second schematic structural diagram of hardware of an electronic device according to an embodiment of this application.

FIG. 4 is a schematic structural diagram of hardware of an electronic device according to an embodiment of this application.

An electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the electronic device 1000 may further include a power supply (such as a battery) that supplies power to each component. The power supply may be logically connected to the processor 1010 by using a power supply management system, to implement functions such as charging and discharging management, and power consumption management by using the power supply management system. The structure of the electronic device shown in FIG. 4 does not constitute a limitation on the electronic device. The electronic device may include components more or fewer than those shown in the diagram, a combination of some components, or different component arrangements. Details are not described herein.

The processor 1010 is configured to: obtain a failure rate relative growth rate, a user disconnection ratio relative growth rate, and a low network speed ratio of a target cell, where the failure rate relative growth rate, the user disconnection ratio relative growth rate, and the low network speed ratio are all associated with at least one of time information and scene information; determine that the target cell has a first abnormal attribute in a case that a sum of the failure rate relative growth rate and the user disconnection ratio relative growth rate of the target cell is greater than a first threshold; and determine that the target cell has a second abnormal attribute in a case that the low network speed ratio of the target cell is greater than a second threshold.

In this way, in this embodiment of this application, based on historical data, for a network anomaly reported by a large quantity of user terminal devices for a target cell, a failure rate relative growth rate, a user disconnection ratio relative growth rate, and a low network speed ratio of the target cell may be obtained. A sum of the failure rate relative growth rate and the user disconnection ratio relative growth rate is used to represent ratio information of a network disconnection anomaly in the target cell, and the low network speed ratio is used to represent ratio information of a low-speed network anomaly in the target cell. Further, the two pieces of obtained ratio information are separately compared with a corresponding first threshold and a corresponding second threshold. Correspondingly, when one piece of ratio information is greater than a first threshold, it is considered that the target cell is more prone to a network disconnection anomaly, and it is determined that the target cell has a first abnormal attribute. When the other piece of ratio information is greater than a second threshold, it is considered that the target cell is more prone to a low-speed network anomaly, and it is determined that the target cell has a second abnormal attribute. It can be learned that based on the abnormal cell identification method in this application, at least two types of abnormal cells that have the first abnormal attribute and the second abnormal attribute can be more precisely identified. Compared with the prior art in which only one type of abnormal cell can be generally identified, this application greatly increases a coverage area of an abnormal cell.

In some embodiments, the processor 1010 is further configured to forbid access to the target cell in a process of detecting that the electronic device accesses the target cell.

In some embodiments, the processor 1010 is further configured to: obtain target time information of the electronic device in the process of detecting that the electronic device accesses the target cell; and forbid access to the target cell in a case that the target time information matches time information associated with the first abnormal attribute, where the target time information includes any one of morning time period information, noon time period information, and evening time period information, and/or any one of working day information and off day information; and/or obtain target scene information of the electronic device in the process of detecting that the electronic device accesses the target cell, and forbid access to the target cell in a case that the target scene information matches scene information associated with the first abnormal attribute, where the target scene information includes any one of high-speed railway scene information, subway scene information, high-speed scene information, and mall scene information.

In some embodiments, the processor 1010 is further configured to access the target cell and set a connection mode of the electronic device to a dual connectivity mode in a process of detecting that the electronic device accesses the target cell.

In some embodiments, the processor 1010 is further configured to: obtain target time information of the electronic device in the process of detecting that the electronic device accesses the target cell; and in a case that the target time information matches time information associated with the second abnormal attribute, access the target cell and set the connection mode of the electronic device to the dual connectivity mode, where the target time information includes any one of morning time period information, noon time period information, and evening time period information, and/or any one of working day information and off day information, and/or obtain target scene information of the electronic device in the process of detecting that the electronic device accesses the target cell, and in a case that the target scene information matches scene information associated with the second abnormal attribute, access the target cell and set the connection mode of the electronic device to the dual connectivity mode, where the target scene information includes any one of high-speed railway scene information, subway scene information, high-speed scene information, and mall scene information.

In some embodiments, the processor 1010 is further configured to: obtain a failure rate and a user disconnection ratio of the target cell according to a disconnection event of the target cell; obtain a total failure rate and a total user disconnection ratio of a target region range according to a disconnection event of the target region range in which the target cell is located; obtain the failure rate relative growth rate of the target cell according to the failure rate and the total failure rate, and obtain the user disconnection ratio relative growth rate of the target cell according to the user disconnection ratio and the total user disconnection ratio; obtain a quantity of access times at a low network speed and a total quantity of access times of the target cell according to an event that a network speed of the target cell is less than a third threshold; and determine a ratio of the quantity of access times at a low network speed to the total quantity of access times as the low network speed ratio.

Compared with the prior art, in this application, firstly, not only a network disconnection anomaly is considered, but also a low-speed network anomaly is considered, to increase coverage of an abnormal cell. Secondly, different measures are taken for different types of network anomalies to effectively evade the anomalies. Thirdly, impact of a time dimension and a space dimension is considered, and an abnormal cell can be evaded more precisely.

It should be understood that, in this embodiment of this application, the input unit 1004 may include a Graphics Processing Unit (GPU) 10041 and a microphone 10042, and the graphics processing unit 10041 processes image data of a still picture or a video image obtained by an image capture apparatus (such as a camera) in a video image capture mode or an image capture mode. The display unit 1006 may include a display panel 10061. In some embodiments, the display panel 10061 may be configured in a form such as a liquid crystal display or an organic light-emitting diode. The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein. The memory 1009 may be configured to store a software program and various data, including but not limited to an application and an operating system. An application processor and a modem processor may be integrated into the processor 1010, the application processor mainly processes an operating system, a user interface, an application, and the like, and the modem processor mainly processes wireless communication. It can be understood that the modem processor may not be integrated into the processor 1010.

An embodiment of this application further provides a readable storage medium. The readable storage medium stores a program or an instruction, and when the program or the instruction is executed by a processor, the processes of the foregoing abnormal cell identification method embodiment are implemented and a same technical effect can be achieved. To avoid repetition, details are not described herein again.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing abnormal cell identification method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in the embodiments of this application. The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A method for abnormal cell identification, performed by an electronic device, comprising:

obtaining a failure rate relative growth rate, a user disconnection ratio relative growth rate, and a low network speed ratio of a target cell, wherein the failure rate relative growth rate, the user disconnection ratio relative growth rate, and the low network speed ratio are all associated with at least one of time information or scene information, wherein the failure rate relative growth rate of the target cell is a ration of a difference between a failure rate of the target cell and a total failure rate of a target region range in which the target cell is located to the total failure rate of the target region range, and the user disconnection ratio relative growth rate of the target cell is a ratio of a difference between a user disconnection ratio of the target cell and a total user disconnection ratio of the target region range to the total user disconnection ratio of the target region range;

determining that the target cell has a first abnormal attribute when a sum of the failure rate relative growth rate and the user disconnection ratio relative growth rate of the target cell is greater than a first threshold; and determining that the target cell has a second abnormal attribute when the low network speed ratio of the target cell is greater than a second threshold.

2. The method according to claim 1, wherein after determining that the target cell has the first abnormal attribute when the sum of the failure rate relative growth rate and the user disconnection ratio relative growth rate of the target cell is greater than the first threshold, the method further comprises:

forbidding access to the target cell in a process of detecting that the electronic device accesses the target cell.

3. The method according to claim 2, wherein the forbidding access to the target cell in the process of detecting that the electronic device accesses the target cell comprises:

obtaining target time information of the electronic device in the process of detecting that the electronic device accesses the target cell; and forbidding access to the target cell when the target time information matches time information associated with the first abnormal attribute, wherein the target time information comprises any one of morning time period information, noon time period information, or evening time period information, or any one of working day information or off day information; or obtaining target scene information of the electronic device in the process of detecting that the electronic device accesses the target cell; and forbidding access to the target cell when the target scene information matches scene information associated with the first abnormal attribute, wherein the target scene information comprises any one of high-speed railway scene information, subway scene information, high-speed scene information, or mall scene information.

4. The method according to claim 1, wherein after determining that the target cell has the second abnormal attribute when the low network speed ratio of the target cell is greater than the second threshold, the method further comprises:

accessing the target cell and setting a connection mode of the electronic device to a dual connectivity mode in a process of detecting that the electronic device accesses the target cell.

5. The method according to claim 4, wherein accessing the target cell and setting the connection mode of the electronic device to the dual connectivity mode in the process of detecting that the electronic device accesses the target cell comprises:

obtaining target time information of the electronic device in the process of detecting that the electronic device accesses the target cell; and when the target time information matches time information associated with the second abnormal attribute, accessing the target cell and setting the connection mode of the electronic device to the dual connectivity mode, wherein the target time information comprises any one of morning time period information, noon time period information, or evening time period information, or any one of working day information or off day information; or obtaining target scene information of the electronic device in the process of detecting that the electronic device accesses the target cell; and when the target scene information matches scene information associated with the second abnormal attribute, accessing the target cell and setting the connection mode of the electronic device to the dual connectivity mode, wherein the target scene information comprises any one of high-speed railway scene information, subway scene information, high-speed scene information, or mall scene information.

6. The method according to claim 1, wherein obtaining the failure rate relative growth rate, the user disconnection ratio relative growth rate, and the low network speed ratio of the target cell comprises:

obtaining the failure rate and the user disconnection ratio of the target cell according to a disconnection event of the target cell;

obtaining the total failure rate and the total user disconnection ratio of the target region range according to a disconnection event of the target region range in which the target cell is located;

obtaining the failure rate relative growth rate of the target cell according to the failure rate and the total failure rate, and obtaining the user disconnection ratio relative growth rate of the target cell according to the user disconnection ratio and the total user disconnection ratio;

obtaining a quantity of access times at a low network speed and a total quantity of access times of the target cell according to an event that a network speed of the target cell is less than a third threshold; and determining a ratio of the quantity of access times at a low network speed to the total quantity of access times as the low network speed ratio.

7. An electronic device, comprising: a memory storing a computer program; and a processor coupled to the memory and configured to execute the computer program to perform operations comprising:

obtaining a failure rate relative growth rate, a user disconnection ratio relative growth rate, and a low network speed ratio of a target cell, wherein the failure rate relative growth rate, the user disconnection ratio relative growth rate, and the low network speed ratio are all associated with at least one of time information or scene information, wherein the failure rate relative growth rate of the target cell is a ration of a difference between a failure rate of the target cell and a total failure rate of a target region range in which the target cell is located to the total failure rate of the target region range, and the user disconnection ratio relative growth rate of the target cell is a ratio of a difference between a user disconnection ratio of the target cell and a total user disconnection ratio of the target region range to the total user disconnection ratio of the target region range;

determining that the target cell has a first abnormal attribute when a sum of the failure rate relative growth rate and the user disconnection ratio relative growth rate of the target cell is greater than a first threshold; and determining that the target cell has a second abnormal attribute when the low network speed ratio of the target cell is greater than a second threshold.

8. The electronic device according to claim 7, wherein after determining that the target cell has the first abnormal attribute when the sum of the failure rate relative growth rate and the user disconnection ratio relative growth rate of the target cell is greater than the first threshold, the operations further comprise:

forbidding access to the target cell in a process of detecting that the electronic device accesses the target cell.

9. The electronic device according to claim 8, wherein the forbidding access to the target cell in the process of detecting that the electronic device accesses the target cell comprises:

obtaining target time information of the electronic device in the process of detecting that the electronic device accesses the target cell; and forbidding access to the target cell when the target time information matches time information associated with the first abnormal attribute, wherein the target time information comprises any one of morning time period information, noon time period information, or evening time period information, or any one of working day information or off day information; or obtaining target scene information of the electronic device in the process of detecting that the electronic device accesses the target cell; and forbidding access to the target cell when the target scene information matches scene information associated with the first abnormal attribute, wherein the target scene information comprises any one of high-speed railway scene information, subway scene information, high-speed scene information, or mall scene information.

10. The electronic device according to claim 7, wherein after determining that the target cell has the second abnormal attribute when the low network speed ratio of the target cell is greater than the second threshold, the operations further comprise:

accessing the target cell and setting a connection mode of the electronic device to a dual connectivity mode in a process of detecting that the electronic device accesses the target cell.

11. The electronic device according to claim 10, wherein accessing the target cell and setting the connection mode of the electronic device to the dual connectivity mode in the process of detecting that the electronic device accesses the target cell comprises:

obtaining target time information of the electronic device in the process of detecting that the electronic device accesses the target cell; and when the target time information matches time information associated with the second abnormal attribute, accessing the target cell and setting the connection mode of the electronic device to the dual connectivity mode, wherein the target time information comprises any one of morning time period information, noon time period information, or evening time period information, or any one of working day information or off day information; or obtaining target scene information of the electronic device in the process of detecting that the electronic device accesses the target cell; and when the target scene information matches scene information associated with the second abnormal attribute, accessing the target cell and setting the connection mode of the electronic device to the dual connectivity mode, wherein the target scene information comprises any one of high-speed railway scene information, subway scene information, high-speed scene information, or mall scene information.

12. The electronic device according to claim 7, wherein obtaining the failure rate relative growth rate, the user disconnection ratio relative growth rate, and the low network speed ratio of the target cell comprises:

obtaining the failure rate and the user disconnection ratio of the target cell according to a disconnection event of the target cell;

obtaining the total failure rate and the total user disconnection ratio of the target region range according to a disconnection event of the target region range in which the target cell is located;

obtaining the failure rate relative growth rate of the target cell according to the failure rate and the total failure rate, and obtaining the user disconnection ratio relative growth rate of the target cell according to the user disconnection ratio and the total user disconnection ratio;

obtaining a quantity of access times at a low network speed and a total quantity of access times of the target cell according to an event that a network speed of the target cell is less than a third threshold; and determining a ratio of the quantity of access times at a low network speed to the total quantity of access times as the low network speed ratio.

13. A non-transitory computer-readable storage medium, storing a computer program, wherein the computer program, when executed by a processor of an electronic device, causes the processor to perform operations comprising:

obtaining a failure rate relative growth rate, a user disconnection ratio relative growth rate, and a low network speed ratio of a target cell, wherein the failure rate relative growth rate, the user disconnection ratio relative growth rate, and the low network speed ratio are all associated with at least one of time information or scene information, wherein the failure rate relative growth rate of the target cell is a ration of a difference between a failure rate of the target cell and a total failure rate of a target region range in which the target cell is located to the total failure rate of the target region range, and the user disconnection ratio relative growth rate of the target cell is a ratio of a difference between a user disconnection ratio of the target cell and a total user disconnection ratio of the target region range to the total user disconnection ratio of the target region range;

determining that the target cell has a first abnormal attribute when a sum of the failure rate relative growth rate and the user disconnection ratio relative growth rate of the target cell is greater than a first threshold; and determining that the target cell has a second abnormal attribute when the low network speed ratio of the target cell is greater than a second threshold.

14. The non-transitory computer-readable storage medium according to claim 13, wherein after determining that the target cell has the first abnormal attribute when the sum of the failure rate relative growth rate and the user disconnection ratio relative growth rate of the target cell is greater than the first threshold, the operations further comprise:

forbidding access to the target cell in a process of detecting that the electronic device accesses the target cell.

15. The non-transitory computer-readable storage medium according to claim 14, wherein the forbidding access to the target cell in the process of detecting that the electronic device accesses the target cell comprises:

obtaining target time information of the electronic device in the process of detecting that the electronic device accesses the target cell; and forbidding access to the target cell when the target time information matches time information associated with the first abnormal attribute, wherein the target time information comprises any one of morning time period information, noon time period information, or evening time period information, or any one of working day information or off day information; or obtaining target scene information of the electronic device in the process of detecting that the electronic device accesses the target cell; and forbidding access to the target cell when the target scene information matches scene information associated with the first abnormal attribute, wherein the target scene information comprises any one of high-speed railway scene information, subway scene information, high-speed scene information, or mall scene information.

16. The non-transitory computer-readable storage medium according to claim 13, wherein after determining that the target cell has the second abnormal attribute when the low network speed ratio of the target cell is greater than the second threshold, the operations further comprise:

accessing the target cell and setting a connection mode of the electronic device to a dual connectivity mode in a process of detecting that the electronic device accesses the target cell.

17. The non-transitory computer-readable storage medium according to claim 16, wherein accessing the target cell and setting the connection mode of the electronic device to the dual connectivity mode in the process of detecting that the electronic device accesses the target cell comprises:

obtaining target time information of the electronic device in the process of detecting that the electronic device accesses the target cell; and when the target time information matches time information associated with the second abnormal attribute, accessing the target cell and setting the connection mode of the electronic device to the dual connectivity mode, wherein the target time information comprises any one of morning time period information, noon time period information, or evening time period information, or any one of working day information or off day information; or obtaining target scene information of the electronic device in the process of detecting that the electronic device accesses the target cell; and when the target scene information matches scene information associated with the second abnormal attribute, accessing the target cell and setting the connection mode of the electronic device to the dual connectivity mode, wherein the target scene information comprises any one of high-speed railway scene information, subway scene information, high-speed scene information, or mall scene information.

18. The non-transitory computer-readable storage medium according to claim 13, wherein obtaining the failure rate relative growth rate, the user disconnection ratio relative growth rate, and the low network speed ratio of the target cell comprises:

obtaining the failure rate and the user disconnection ratio of the target cell according to a disconnection event of the target cell;

obtaining the total failure rate and the total user disconnection ratio of the target region range according to a disconnection event of the target region range in which the target cell is located;

obtaining the failure rate relative growth rate of the target cell according to the failure rate and the total failure rate, and obtaining the user disconnection ratio relative growth rate of the target cell according to the user disconnection ratio and the total user disconnection ratio;

obtaining a quantity of access times at a low network speed and a total quantity of access times of the target cell according to an event that a network speed of the target cell is less than a third threshold; and determining a ratio of the quantity of access times at a low network speed to the total quantity of access times as the low network speed ratio.

* * * * *